United States Patent [19]
Todani et al.

[11] 3,872,036
[45] Mar. 18, 1975

[54] PROCESS FOR PREPARATION OF RUBBER COMPOSITION

[75] Inventors: Yoshihiro Todani, Kamakura; Nagatoshi Sugi; Kinro Hashimoto, both of Yokohama, all of Japan

[73] Assignee: The Japanese Geon Co. Ltd., Tokyo, Japan

[22] Filed: Mar. 10, 1971

[21] Appl. No.: 123,020

[30] Foreign Application Priority Data
Mar. 11, 1970 Japan.............................. 45-20071

[52] U.S. Cl......... 260/5, 260/41.5 R, 260/41.5 MP, 260/894
[51] Int. Cl....... C08c 9/04, C08c 11/18, C08d 9/00
[58] Field of Search.... 260/41.5 MP, 894, 5, 41.5 R

[56] References Cited
UNITED STATES PATENTS
| | | | |
|---|---|---|---|
| 2,764,572 | 9/1956 | Pechukas | 260/5 |
| 3,463,755 | 8/1969 | Forrester et al. | 260/41.5 MP |
| 3,533,988 | 10/1970 | Morris et al. | 260/41.5 MP |

*Primary Examiner*—Morris Liebman
*Assistant Examiner*—H. H. Fletcher
*Attorney, Agent, or Firm*—Sherman & Shalloway

[57] ABSTRACT

A process for the preparation of a carbon black-containing rubber composition having improved green strength the rubber components of which consist of 80 – 40 percent by weight of butadiene-acrylonitrile copolymer rubber (A) and 20 – 60 percent by weight of isoprene-acrylonitrile copolymer rubber (B) or a carbon black-containing rubber composition the rubber components of which consist of 60 – 30 percent by weight of butadiene-styrene copolymer rubber (A) and 40 – 70 percent by weight of natural rubber (B), wherein 100 parts by weight of rubber (A) are mixed with 30 – 100 parts by weight of carbon black, the mixture is milled and aged, and then it is mixed with rubber (B), and the resultant mixture is milled.

3 Claims, No Drawings

PROCESS FOR PREPARATION OF RUBBER COMPOSITION

The present invention relates to a process for the preparation of an improved rubber composition, and more particularly to a process for improving the green strength of a rubber composition comprising butadiene-acrylonitrile copolymer rubber, isoprene-acrylonitrile copolymer rubber and carbon black or a rubber composition comprising butadiene-styrene copolymer rubber, natural rubber and carbon black.

Heretofore, butadiene-acrylonitrile copolymer rubber (which will herinafter be referred to as NBR) and isoprene-acrylonitrile copolymer rubber (which will hereinafter be referred to as NIR) have been widely used as special rubbers, and butadiene-styrene copolymer rubber (which will hereinafter be referred to as SBR) and natural rubber have been widely used as rubbers for universal use. These rubbers have their respective characteristics, and they are not only used alone, but also used as blends having properties superior to the individual component rubbers. When a rubber is processed, a reinforcing agent such as carbon black is generally incorporated, and further it is cross-linked with a cross-linking agent, but where not less than two kinds of rubber are blended, the incorporation of carbon black has usually been carried out after the two kinds of rubbers are blended togther or simultaneously with the blending ehblending of the rubbers. It has also been known previously that butadiene type synthetic rubbers such as NBR and SBR have inferior green strength as compared with natural rubber and NIR, and for this reason there have been many problems, such as breakage of rubber and ustabilized shape, in the manufacture of rubber products especially in the step of tire fabrication This defect of butadiene type synthetic rubbers cannot be removed by blending these with natural rubber or NIR and carbon black by the conventional procedure. Mainly for this reason, the proportion of butadiene type synthetic rubbers used has not been able to be raised in the field of blended rubbers. Accordingly, various studies have been made on the improvement of green strength of butadiene type synthetic rubbers.

Generally, it is considered that the green strength of a rubber depends on the molecular weight distribution of the rubber, and it can be improved by the presence of a high molecular weight polymer in the rubber. As a matter of fact, if an ultrahigh molecular weight polymer is blended with a rubber, the green strength of the rubber can be remarkably improved. However, if carbon black is added to this blend, this effect is entirely lost. In other words, a method for the improvement of green strength in a rubber containing no carbon black does not apply to the improvement of green strength in a rubber blend containing carbon black. When a rubber is blended with carbon black, polymers are adsorbed to the surface of carbon black, and at this time polymers of higher molecular weight are selectively absorbed. This phenonmenon has long been known. The reason why the effect of green strength improvement is lost when carbon black is incorporated into a rubber whose green strength has been improved by an ultrahigh molecular weight polymer is probably that the untrahigh molecular weight polymer is selectively absorbed onto the surface of carbon black to form a carbon gel.

Accordingly, one object of the present invention is to provide a process for improving the green strength of a rubber composition comprising NBR, NIR and carbon black or a rubber composition comprising SBR, natural rubber and carbon black.

The other objects of the present invention will be made clear by the following description.

It has been discovered that these objects of the present invention can be attained by compounding 100 parts by weight of rubber (A) with 30 – 100 parts by weight of carbon black, milling and ageing the mixture, and then compounding it wih rubber (B) and milling the mixture at the time of producing a carbon black-containing rubber composition the rubber components of which consist of 80 – 40 percent by weight of NBR (A) and 20 – 60 percent by weight of NIR (B) or a carbon black-containing rubber composition the rubber components of which consist of 60 – 30 percent by weight of SBR (A) and 40 – 70 percent by weight of natural rubber (B).

As described above, rubber (A) (NBR or SBR) is known to have inferior green strength, and rubber (B) (NIR or natural rubber) is known to have superior green strength. Accordingly, rubber compositions obtained by blending only rubber (A) and rubber (B) together can possess improved green strength. However, rubber compositions comprising rubber (A), rubber (B) and carbon black do not show improved green strength for the above-described reason, as long as the carbon black is blended by the conventional procedures.

However, the green strength of rubber compositions can be remarkably improved by the method of the present invention, namely by first compounding rubber (A) (NBR or SBR) which has inferior green strength with carbon black, milling and ageing the mixture, thereby allowing the surface of carbon black to adsorb polymers to form a carbon gel (which blend will herinafter be referred to as gelled carbon black master batch or GCM), and then compounding the blend with rubber (B) (NIR or natural rubber) having superior green strength.

The method of the present invention can be applied to rubber compositions the rubber components of which consist of 80 –40 percent by weight of NBR and 20 – 60 percent by weight of NIR and rubber compositions the rubber components of which consist of 60 – 30 percent by weight of SBR and 40 – 70 percent by weight of natural rubber. Namely, if NBR exceeds 80 percent by weight or SBR exceeds 60 percent by weight, the effect of green strength improvement by addition of NIR or natural rubber can not be expected, whereas if NBR is lower than 40 percent by weight or SBR is lower than 30 percent by weight, the resultant blend does not substantially differ from the case where NIR or natural rubber is used alone, and the effect of the present invention can not be achieved. Further, the amount of carbon black to be used for the preparation of the gelled carbon black master batch is 30 – 100 parts by weight per 100 parts by weight of NBR or SBR. When the amount of carbon black is less than 30 parts by weight, green strength can not be improved, whereas if it exceeds 100 parts by weight, an over carbon gelling (like carbn scorching) phenomenon occurs, dispersion becomes poor in the final composition, and this adversely affects the physical properties and processability of the rubber. Further, in order to prepare the gelled carbon black master batch, it is necessary that NBR or SBR should be compounded and milled with carbon black and the blend should be aged sufficiently, as described above. Ageing here means allowing the blend to stand at room temperature usually for not less than 12 hours, preferably not less than 1 day. If NIR or natural rubber is incorporated into the blend without ageing the blend, green strength can not be improved.

The NBR, NIR and SBR used in the method of the present invention may be produced by the conventional emulsion polymerization technique. The acrylonitrile contents of NBR and NIR are usually 10 – 60 percent, preferably 20 – 40 percent, and the styrene content of SBR is usually 10 – 50 percent, preferably 15 – 30 percent. Such synthetic rubbers and natural rubber may have suitable molecular weights, and those having a Mooney viscosity of 20 – 200 are generally used.

Preparation of the gelled carbn black master batch is usually carried out by a mechanical mixer such as roll mill or Banbury mixer, but it may also be carried out by incorporating an aqueous or non-aqueous dispersion of carbon black into a latex of NBR or SBR, thereby obtaining a socalled wet process carbon black mater batch. However, in case this wet process is followed, the formation of carbon gel is less since the rubber has not been subjected to a milling operation after drying, and so no noticeable effect can be achieved. For this reason, it is necessary that the rubber after drying should be milled with an extruder, etc., or mechanical milling by means of a roll mill or a Banbury mixer should be effected prior to blending with the other rubber, and then it should be aged sufficiently.

The rubber composition of the invention can be produced by compounding the gelled carbon black master batch thus obtained with NIR or natural rubber and if desired, carbon black, and mechanically milling the mixture. At this time, a part of NIR or natural rubber may be replaced by NBR or SBR, respectively.

Further, besides carbon black, an ordinary softening agent, process oil, etc. may also be incorporated according to need in the rubber composition of the present invention. Usually 40 – 150 parts by weight of carbon black and 30 – 100 parts by weight of process oil per 100 parts by weight of total rubber are used.

The carbon black in the rubber composition of the present invention has preliminarily been saturated with NBR or SBR having inferior green strength unlike the case of the conventional blending process, and so NIR or natural rubber which originally has superior green strength can act upon it effectively. Therefore, according to the present invention, a rubber composition which as a whole has very superior green strength characteristic can be obtained.

Next, the present invention will be illustrated by non-limitative Examples.

EXAMPLE 1

Compositions A and B each consisting of 75 parts by weight of NBR (Hycar 1052J made by the Japanese Geon Co., Ltd.), 25 parts by weight of NIR (Polysar 833 made by Polymer Corporation Ltd.) and 30 parts by weight of HAF carbon black were prepared in accordance with the following procedures.

Composition A:

NBR and carbon black were preliminarily milled together by 6-inch rolls at about 60°C. for 7 minutes, the blend was allowed to stand at room temperature for 10 days, and then NIR was milled therewith by rolls at about 60°C.

Composition B:

NBR and NIR were milled together by 6-inch rolls at about 60°C. for 2 minutes, and then HAF carbon black was added to it and the mixture was milled for 8 minutes.

These compositions were shaped by 6-inch rolls into sheets having a thickness of about 2.5 mm. Each sheet was placed in a metal mould having a thickness of 2 mm, and then was heated at 100°– 110°C. for 60 minutes under a pressure of 75 tons and then the same pressure was applied thereto for 180 minutes, while cooling it gradually, to form a sheet having a thickness of about 2 mm and a smooth surface. Out of this sheet dumbbell test pieces as specified in JIS No. 3 were punched in parallel with the rolling orientation. After this test piece was allowed to stand for one day, it was stretched by an Instron tension tester at a stretch velocity of 500 mm/min., and the relation between elongation and tension was measured. To measure the elongation accurately, measure lines were drawn on the test piece at intervals of 20 mm, and the change of distance between the measure lines was read, and the corresponding tension was measured. Tensile (stress per unit cross-sectional area of the unstretched test piece) at each ratio of elongation is shown in the following Table 1. From this Table it is found that composition A prepared in accordance with the method of the present invention shows a higher tension at every ratio of elongation, especially at elongation ratios of 10 – 20, as compared wth composition B prepared by the conventional method.

Table 1

| Ratio of elongation (times) Tension (kg/cm$^2$) (MD$_{1+4}$/100°C.) | 1 | 2 | 4 | 6 | 8 | 10 | 12 | 14 | 16 | 18 | 20 |
| --- | --- | --- | --- | --- | --- | --- | --- | --- | --- | --- | --- |
| Composition A (71.0) | 9.5 | 8.5 | 7.4 | 7.2 | 7.2 | 7.3 | 7.2 | 6.8 | 6.5 | 6.0 | 5.6 |
| Composition B (73.5) | 9.0 | 8.0 | 7.0 | 6.5 | 6.0 | 5.4 | 5.0 | 4.4 | 3.8 | 3.4 | 3.0 |

EXAMPLE 2

An experimental Banbury mixer having a capacity of 0.8 liter was used, and 4 kinds of gelled carbon black master batches (GCM) I - IV were prepared under the conditions of Table 2 and those following.

Table 2

Composition of Gelled Carbon Black Master Batches

| | GCM I | GCM II | GCM III | GCM IV |
|---|---|---|---|---|
| Oil-extended SBR (Nipol 1778 J) * | 137.5 parts by weight | 137.5 | 137.5 | 137.5 |
| HAF carbon black (Seest 3) | 40 part by weight | 70 | 95 | 125 |

* Naphthenic oil/SBR = 37.5/100, made by Japanese Geon Co., Ltd. Mooney viscosity $(ML_{1+4}/100°C.) = 43.0$ The initial side wall temperature and the number of rotation of the rotor were made 60°C. and 180 rpm, respectively, and the heating jacket was controlled so as to maintain the temperature of the stock at 90°- 100°C. One minute after the oil-extended SBR was placed in the Banbury mixer, carbon black was added, and the milling was continued for 5 minutes.

After the gelled carbon black master batches I – IV thus prepared were allowed to stand at room temperature for 7 days, they were milled with natural rubber (RSS No. 1) and carbon black by using a 0.8 liter Banbury mixer, and finally compounds I - IV each consisting of 50 parts by weight of oil-extended SBR, 50 parts by weight of natural rubber and 45 parts by weight of HAF carbon black were obtained. Further, in this case, the Banbury milling conditions were the same as those for the preparation of said GCM. Namely, first the gelled carbon black master batch was milled with masticated natural rubber for 1 minute, and then carbon black was added thereto, and milling was carried out for 5 minutes.

On the other hand, for comparison's sake, compound V was prepared by the ordinary milling method wherein the whole amount of carbon black is added after oil-extended SBR has been blended with natural rubber.

The recipe for the final compounds was as shown in the following Table 3.

Table 3

| Recipe Compound | Recipe for Compounds | | |
|---|---|---|---|
| | Natural rubber* (parts by weight) | GCM I – IV (parts by weight) | HAF Carbon (parts by weight) |
| I | 100 | I 130 | 60 |
| II | 100 | II 150 | 40 |
| III | 100 | III 170 | 20 |
| IV | 100 | IV 190 | — |
| V | 100 | Oil extended SBR 100 | 90 |

* Mooney Viscosity = 60.

Dumbbell test pieces were produced out of these compounds under the same conditions as those of Example 1, and then the relation between elongation and tension was measured. The results were as shown in the following Table 4.

Further, each of compounds II and V were suspended in a 40 times amount of benzone by stirring the mixture for 24 hours, and then this suspension was subjected to the action of a 1200 rpm centrifuge to precipitate carbon gel. The carbon gel was fully dried, decomposed by heating, and then the gas evolved was analyzed by gas chromatography to determine its composition. The results were as shown in the following Table 5.

Table 4

| Elongation ratio (times) Tension (kg/cm²) $(ML_{1+4}/100°C.)$ | 0.5 | 1 | 2 | 3 | 4 | 5 | 6 | 7 | 8 | 9 | 10 | Elongation at breakage (times) |
|---|---|---|---|---|---|---|---|---|---|---|---|---|
| Compound I (51.0) | 3.6 | 3.6 | 3.3 | 3.3 | 3.6 | 3.7 | 4.0 | 4.2 | 4.5 | 4.7 | 4.9 | 10.1 |
| Compound II (49.5) | 3.8 | 3.6 | 3.4 | 3.5 | 3.8 | 4.2 | 4.5 | 5.0 | 5.4 | 5.6 | 5.8 | 10.4 |
| Compound III (46.9) | 3.6 | 3.5 | 3.3 | 3.3 | 3.5 | 3.6 | 3.9 | 4.1 | 4.3 | 4.4 | 4.4 | 10.0 |
| Compound IV (43.0) | 3.8 | 3.7 | 3.6 | 3.6 | 3.7 | 3.8 | 3.7 | — | — | — | — | 6.0 |
| Compound V (48.0) | 3.6 | 3.5 | 3.2 | 3.0 | 2.9 | 2.9 | 2.9 | 3.0 | 3.1 | 3.1 | — | 9.2 |

Table 5

| Composition of Carbon Gel | | |
|---|---|---|
| | SBR | Natural rubber |
| Compound II | 52 % | 48 % |
| Compound V | 30 % | 70 % |

From Table 4, it is seen that a superior green strength characteristic can be obtained by preliminarily producing a carbon master batch from 100 parts by weight of SBR and 40 – 95 parts by weight of carbon black. From Table 5, it is found that in the compound prepared by the method of the present invention, the amount of natural rubber absorbed by carbon black is small.

EXAMPLE 3

Four kinds of compound VI - IX composed of oil-extended SBR, natural rubber and carbon black according to the recipe shown in the following Table 6 were prepared by using a Banbury mixer in the same manner as in Example 2, and then the relation between elongation and tension was measured in the same manner as in Example 1. The results were as shown in the following Table 7.

Table 6

| (parts by weight) | Recipe for Compound | Natural rubber (parts by weight) | Carbon black (parts by weight) |
|---|---|---|---|
| Compound VI | GCM II* 90 | 40 | 20 |
| Compound VII | Oil-extended SBR** 60 | 40 | 50 |
| Compound VIII | GCM II* 60 | 60 | 30 |
| Compound IX | Oil-extended SBR** 40 | 60 | 50 |

\* The same with GCM II of Example 2 (which was prepared by mixing 137.5 parts by weight of oil-extended SBR with 70 parts by weight of carbon black, milling the mixture, and then allowing it to stand for 7 days).
\*\* Nipol 1778 J.

Table 7

| Elongation ratio (times) Tension (kg/cm$^2$) (ML$_{1+4}$/100°C.) | 0.5 | 1 | 2 | 3 | 4 | 6 | 8 | 10 | 12 | Elongation at breakage (times) |
|---|---|---|---|---|---|---|---|---|---|---|
| Compound VI (53.5) | 3.6 | 3.5 | 3.0 | 3.0 | 3.1 | 3.3 | 3.7 | 3.9 | 4.0 | 12.5 |
| Compound VII (53.5) | 3.6 | 3.4 | 3.0 | 2.8 | 2.6 | 2.4 | 2.3 | 2.1 | — | 11.0 |
| Compound VIII (53.0) | 4.2 | 4.6 | 5.2 | 6.4 | 8.2 | 11.3 | 14.0 | — | — | 9.0 |
| Compound IX (54.0) | 4.2 | 4.5 | 5.0 | 5.7 | 6.8 | 8.7 | 10.3 | — | — | 8.0 |

From the above results, it is found that a very superior green strength characteristic is shown when a compound of 60 percent by weight of oil-extended SBR (about 43 percent calculatex as SBR) and 40 percent by weight of natural rubber or a compound of 40 percent by weight of oil-extended SBR (about 29 percent calculated as SBR) and 60 percent by weight of natural rubber is prepared in accordance with the method of the present invention.

EXAMPLE 4 compounds each containing equal amounts of oil-extended SBR, natural rubber and carbon black were prepared by using a 1.8 liter Banbury mixer.

Compound X was prepared by adding 70 parts by weight of carbon black to 137.5 parts by weight of oil-extended SBR of Example 2, milling the mixture, and immediately thereafter adding natural rubber and carbon black thereto, and then milling the resultant mixture. Compound XI was prepared by adding 70 parts by weight of carbon black to 137.5 parts by weight of oil-extended SBR, milling the mixture, ageing it at room temperature for 1 day, then adding natural rubber and carbon black thereto, and then milling the mixture. Compound XII was prepared in accordance with the conventional millng method, namely by milling oil-extended SBR with natural rubber, and then milling the compound with carbon black. The milling conditions were the same with those of Example 2.

Dumbbell test pieces were prepared from such compounds in the same manner as in Example 1, and the relation between elongation and tension was measured. The results were as shown in the following Table 8.

From Table 8, it is found that green strength can not be improved if natural rubber is added to gelled carbon black master batch immediately after the batch is prepared.

Table 8

| Elongation ratio (times) Tension (kg/cm$^2$) (ML$_{1+4}$/100°C.) | 0.5 | 1 | 2 | 3 | 4 | 5 | 6 | 7 | 8 | 9 | Elongation at breakage (times) |
|---|---|---|---|---|---|---|---|---|---|---|---|
| Compound X (47.0) | 3.1 | 3.2 | 2.6 | 2.6 | 2.6 | 2.6 | 2.6 | 2.6 | 2.6 | 2.6 | 9.2 |
| Compound XI (52.0) | 3.5 | 3.3 | 2.9 | 2.8 | 2.8 | 2.9 | 3.0 | 3.1 | 3.2 | 3.3 | 9.0 |
| Compound XII (45.5) | 3.2 | 3.1 | 2.7 | 2.6 | 2.5 | 2.4 | 2.3 | 2.2 | — | — | 7.8 |

EXAMPLE 5

Oil-extended SBR latex (Nipol 1712 made by Japanese Geon Co., Ltd.; aromatic oil/SBR = 37.5/100) whose solid content was 100 parts by weight was mixed and stirred with an aqueous suspension of 50 parts by weight of HAF carbon black, the mixture was coagulated by an aqueous salt solution-aqueous sulphuric acid solution, and then it was dried with hot wind (the rubber - carbon black mixture thus obtained will hereinafter be referred to as WCM). A part of WCM was milled with 6-inch rolls for about 2 minutes (this product will hereinafter be referred to as WCMR). 75 parts by weight of each of these WCM and WCMR were allowed to stand for 1 day, and then each was milled with 50 parts by weight of natural rubber and 25 parts by weight of carbon black by use of a Banbury mixer in the same manner as in Exmaple 2, and thus compounds XIII and XIV containing equal amounts of oil-extended SBR, natural rubber and carbon black were prepared. The relation between elongation and tension in these compounds was measured in the same manner as in Example 1. The results were as shown in the following Table 9.

From Table 9, it is found that compound XIV of the present invention which has used the gelled carbon black master batch (WCMR) obtained by application of shearing stress has a superior green strength characteristic as compared with compound XIII which has used th conventional wet process carbon black master batch (WCM).

Table 9

| Elongation ratio (times) Tension (kg/cm²) (ML₁₊₄/100°C.) | 0.5 | 1 | 2 | 3 | 4 | 5 | 7 | 9 | 11 | Elongation at breakage (times) |
|---|---|---|---|---|---|---|---|---|---|---|
| Compound XIII (48.0) | 3.6 | 3.5 | 3.0 | 2.9 | 2.9 | 3.0 | 3.2 | 3.5 | 3.8 | 11.0 |
| Compound XIV (47.0) | 4.0 | 3.8 | 3.4 | 3.3 | 3.4 | 3.6 | 4.2 | 5.0 | 5.7 | 12.0 |

We claim:

1. In a process for the preparation of a carbon black-containing rubber composition wherein the rubber components of said composition consist of 80-40 percent by weight of butadiene-acrylonitrile copolymer rubber (A) and 20-60 percent by weight of isoprene-acrylonitrile copolymer rubber (B) or 60-30 percent by weight of butadiene-styrene copolyner (A) and 40-70 percent by weight of natural rubber (B), the improvement wherein a rubber composition having improved green strength is obtained by mixing 100 parts by weight of said rubber (A) with 30-100 parts by weight of carbon black, milling the resulting mixture and aging the resulting mixture by allowing said mixture to stand at room temperature for a period of at least 12 hours, and then mixing the milled and aged mixture with said rubber (B), and milling the resultant mixture.

2. In a process for the preparation of a carbon black-containing rubber composition wherein the rubber components of said composition consist of 80-40 percent by weight of butadiene-acrylonitrile copolymer rubber (A) and 20-60 percent by weight of isoprene-acrylonitrile copolymer rubber (B) or 60-30 percent by weight of butadiene-styrene copolymer rubber (A) and 40-70 percent by weight of natural rubber (B), the improvement wherein a rubber composition having improved green strength is obtained by first compounding said rubber (A) with carbn black, milling the resulting mixture and aging the resulting mixture by allowing said mixture to stand at room temperature for a period of at least 12 hours, and then mixing the resulting gelled carbon black master batch with said rubber (B) and carbon black, and milling the resultant mixture, the total amount of carbon black used being 40-150 parts by weight per 100 parts by weight of the total rubber.

3. In a process for the preparation of a carbon black-containing rubber composition wherein the rubber components of said composition consist of 80-40 percent by weight of butadiene-acrylonitrile copolymer rubber (A) and 20-60 percent by weight of isoprene-acrylonitrile copolymer rubber (B) or 60-30 percent by weight of butadiene-styrene copolymer rubber (A) and 40-70 percent by weight of natural rubber (B), the improvement wherein a rubber composition having improved green strength is obtained by first mixing a latex of said rubber (A) with a dispersion of carbon black, coagulating, drying and milling the resulting mixture and aging the resulting mixture by allowing said mixture to stand at room temperature for a period of at least 12 hours, and then mixing the resulting gelled carbon black master batch with said rubber (B) and carbon black, and milling the resultant mixture, the total amount of carbon black used being 40-150 parts by weight per 100 parts by weight of the total rubber.

* * * * *